(12) United States Patent
Glasco et al.

(10) Patent No.: US 7,162,589 B2
(45) Date of Patent: Jan. 9, 2007

(54) METHODS AND APPARATUS FOR CANCELING A MEMORY DATA FETCH

(75) Inventors: David B. Glasco, Austin, TX (US); Rajesh Kota, Austin, TX (US)

(73) Assignee: Newisys, Inc., Austin, TX (US)

( * ) Notice: Subject to any disclaimer, the term of this patent is extended or adjusted under 35 U.S.C. 154(b) by 295 days.

(21) Appl. No.: 10/321,078

(22) Filed: Dec. 16, 2002

(65) Prior Publication Data

US 2004/0117559 A1 Jun. 17, 2004

(51) Int. Cl.
G06F 12/00 (2006.01)
G06F 15/16 (2006.01)

(52) U.S. Cl. .................. 711/141; 711/144; 711/119; 711/3; 709/218; 709/219

(58) Field of Classification Search .................. 711/3, 711/119, 141, 144; 709/218, 219
See application file for complete search history.

(56) References Cited

U.S. PATENT DOCUMENTS

| | | | |
|---|---|---|---|
| 5,524,212 A | 6/1996 | Somani et al. | |
| 5,721,864 A * | 2/1998 | Chiarot et al. | 711/137 |
| 5,751,995 A | 5/1998 | Sarangdhar | |
| 5,893,151 A | 4/1999 | Merchant | |
| 5,918,247 A * | 6/1999 | Patel et al. | 711/138 |
| 6,085,295 A | 7/2000 | Ekanadham et al. | |
| 6,108,737 A | 8/2000 | Sharma et al. | |
| 6,167,492 A | 12/2000 | Keller et al. | 711/154 |
| 6,385,705 B1 | 5/2002 | Keller et al. | 711/154 |
| 6,490,661 B1 | 12/2002 | Keller et al. | 711/150 |
| 6,636,906 B1 | 10/2003 | Sharma et al. | |
| 6,640,287 B1 * | 10/2003 | Gharachorloo et al. | 711/141 |
| 6,658,526 B1 * | 12/2003 | Nguyen et al. | 711/111 |
| 6,799,252 B1 | 9/2004 | Bauman | |
| 2001/0013089 A1 * | 8/2001 | Weber | 711/146 |
| 2002/0046327 A1 | 4/2002 | Gharachorloo et al. | |
| 2002/0087807 A1 | 7/2002 | Gharachorloo | |

OTHER PUBLICATIONS

HyperTransport™ I/O Link Specification Revision 1.03, HyperTransport™ Consortium, Oct. 10, 2001, Copyright © 2001 HyperTransport Technology Consortium.
Glasco et al;. U.S. Appl. No. 10/288,347, Office Action issued Nov. 18, 2004.
Sorin et al., "Specifying and Verifying a Broadcast and a Multicast Snooping Cache Coherence Protocol", IEEE vol. 13, No. 6, Jun. 2002.

(Continued)

Primary Examiner—Mano Padmanabhan
Assistant Examiner—Mardochee Chery
(74) Attorney, Agent, or Firm—Beyer, Weaver & Thomas, LLP.

(57) ABSTRACT

According to the present invention, methods and apparatus are provided for increasing the efficiency of data access in a multiple processor, multiple cluster system. Mechanisms for transmitting memory cancels to memory controllers in the various clusters of a multiple cluster system are provided. In one example, memory cancels are transmitted between clusters when it is determined that a memory line associated with a probe is dirty. The memory cancel directs the memory controller to no longer proceed with a data fetch from main memory. In another example, memory cancels are transmitted at a home cluster based on information in a coherence directory in order to more quickly end a data fetch.

25 Claims, 13 Drawing Sheets

OTHER PUBLICATIONS

Martin et al., "Bandwidth Adaptive Snooping" Proceedings of the Eight Int'l Symposium on High Permance Computer Architecture, IEEE, 2002.

Bilir et al., "Multicast Snooping: A New coherence Method Using a Multicast Address Network".

Glasco et al;. U.S. Appl. No. 10/288,399, Office Action issued Nov. 18, 2004.

* cited by examiner

Figure 7

| Coherence Directory 701 | | | |
|---|---|---|---|
| Memory Line 711 | State 713 | Dirty Data Owner 715 | Occupancy Vector 717 |
| Address 721 | Invalid | N/A | N/A |
| Address 731 | Invalid | N/A | N/A |
| Address 741 | Shared | N/A | Clusters 1,3 |
| Address 751 | Shared | N/A | Clusters 1, 2, 3, 4 |
| Address 761 | Owned | Cluster 4 | Cluster 2, 3, 4 |
| Address 771 | Owned | Cluster 2 | Cluster 2, 4 |
| Address 781 | Modified | Cluster 2 | N/A |
| Address 791 | Modified | Cluster 3 | N/A |
| ... | ... | ... | ... |

METHODS AND APPARATUS FOR CANCELING A MEMORY DATA FETCH

CROSS-REFERENCE TO RELATED APPLICATIONS

The present application is related to filed U.S. application Ser. No. 10/288,347, filed Nov. 4, 2002, Entitled METHODS AND APPARATUS FOR MANAGING PROBE REQUESTS, by David B. Glasco, and U.S. application Ser. No. 10/288,399, filed Nov. 4, 2002, Entitled METHODS AND APPARATUS FOR MANAGING PROBE REQUESTS, by David B. Glasco, the entireties of which are incorporated by reference for all purposes.

BACKGROUND OF THE INVENTION

1. Field of the Invention

The present invention generally relates to accessing data in a multiple processor system. More specifically, the present invention provides techniques for improving data access efficiency in a multiple processor system having a multiple cluster architecture.

2. Description of Related Art

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions. However, using a point-to-point architecture to connect multiple processors in a multiple cluster system sharing a single memory space presents its own problems. In one example, data access in multiple processor systems can raise issues relating to latency due to transmission of signals between processors in different clusters in a multiple cluster system.

Consequently, it is desirable to provide techniques for improving data access efficiency in multiple cluster, multiple processor systems.

SUMMARY OF THE INVENTION

According to the present invention, methods and apparatus are provided for increasing the efficiency of data access in a multiple processor, multiple cluster system. Mechanisms for transmitting memory cancels to memory controllers in the various clusters of a multiple cluster system are provided. In one example, memory cancels are transmitted between clusters when it is determined that a memory line associated with a probe is dirty. The memory cancel directs the memory controller to no longer proceed with a data fetch from main memory. In another example, memory cancels are transmitted at a home cluster based on information in a coherence directory in order to more quickly end a data fetch.

In one embodiment, a computer system is provided. The computer system includes a home cluster and a remote cluster. The remote cluster has a first plurality of processors and a home cache coherence controller. The first plurality of processors and the home cache coherence controller are interconnected in a point-to-point architecture. The remote cluster has a second plurality of processors and a remote cache coherence controller. The second plurality of processors and the remote cache coherence controller are interconnected in a point-to-point architecture. The remote cluster cache coherence controller is configured to receive a probe request associated with a memory line and send a memory cancel to the home cluster if a probed memory line associated with one of the second plurality of processors is dirty.

In another embodiment, a method for probing a system is provided. A probe request associated with a memory line is received at a remote cluster. The remote cluster includes a plurality of processors and a remote cache coherence controller. The plurality of processors and the remote cache coherence controller are interconnected in a point-to-point architecture. It is determined if the probed memory line is associated with one of the plurality of processors is dirty. A memory cancel is sent to a home cluster including a home cluster cache coherence controller.

In yet another embodiment, a computer system is provided. The computer system includes a home cluster and a remote cluster. The home cluster includes a first plurality of processors and a home cache coherence controller. The first plurality of processors and the home cache coherence controller are interconnected in a point-to-point architecture. The remote cluster includes a second plurality of processors and a remote cache coherence controller. The second plurality of processors and the remote cache coherence controller are interconnected in a point-to-point architecture. The home cluster cache coherence controller is configured to forward a probe to the remote cluster and send a memory cancel to a home cluster memory controller if the home cluster cache coherence controller determines that the memory line is dirty.

In still another embodiment, a method for probing remote nodes is provided. It is determined at a home cluster if the memory line associated with a request is dirty. A home cluster includes a first plurality of processors and a home cache coherence controller. The first plurality of processors and the home cache coherence controller are interconnected in a point-to-point architecture. A probe is forwarded to a remote cluster. The remote cluster includes a second plurality of processors and a remote cache coherence controller. The second plurality of processors and the remote cache coherence controller are interconnected in a point-to-point architecture. A memory cancel is sent to the home cluster memory controller before a response to the probe is received from the remote cluster.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 7 is a diagrammatic representation showing a cache coherence directory.

DETAILED DESCRIPTION OF SPECIFIC EMBODIMENTS

Figure 1A:
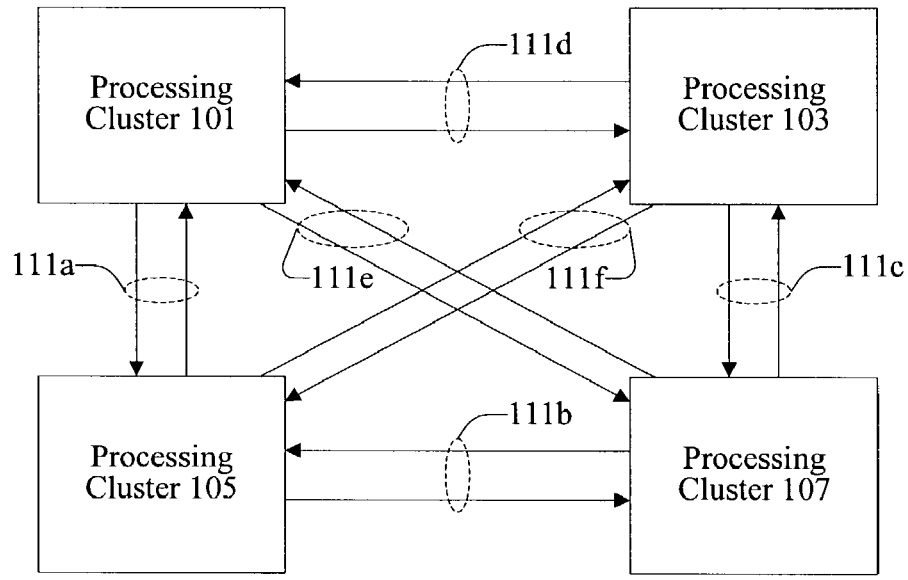
FIGS. 1A and 1B are diagrammatic representation depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Techniques are provided for increasing data access efficiency in a multiple processor, multiple cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

In many implementations, the multiple processor clusters are interconnected using a point-to-point architecture. Each cluster of processors includes a cache coherence controller used to handle communications between clusters. In one embodiment, the point-to-point architecture used to connect processors are used to connect clusters as well.

By using a cache coherence controller, multiple cluster systems can be built using processors that may not necessarily support multiple clusters. Such a multiple cluster system can be built by using a cache coherence controller to represent non-local nodes in local transactions so that local nodes need not be aware of the existence of nodes outside of the local cluster. More detail on the cache coherence controller will be provided below.

In a single cluster system, cache coherency can be maintained by sending all data access requests through a serialization point. Any mechanism for ordering data access requests is referred to herein as a serialization point. One example of a serialization point is a memory controller. Various processors in the single cluster system send data access requests to the memory controller. In one example, the memory controller is configured to serialize or lock the data access requests so that only one data access request for a given memory line is allowed at any particular time. If another processor attempts to access the same memory line, the data access attempt is blocked until the memory line is unlocked. The memory controller allows cache coherency to be maintained in a multiple processor, single cluster system.

A serialization point can also be used in a multiple processor, multiple cluster system where the processors in the various clusters share a single address space. By using a single address space, internal point-to-point links can be used to significantly improve intercluster communication over traditional external network based multiple cluster systems. Various processors in various clusters send data access requests to a memory controller associated with a particular cluster such as a home cluster. The memory controller can similarly serialize all data requests from the different clusters. However, a serialization point in a multiple processor, multiple cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Although delay in intercluster transactions in an architecture using a shared memory space is significantly less than the delay in conventional message passing environments using external networks such as Ethernet or Token Ring, even minimal delay is a significant factor. In some applications, there may be millions of data access requests from a processor in a fraction of a second. Any delay can adversely impact processor performance.

According to various embodiments, memory cancels are used to increase the efficiency of data access in a multiple processor system. In typical implementations, a memory controller probes caches associated with various processors in a multiple processor system when it receives a request. The memory controller also initiates a data fetch to memory to access the memory line associated with the request. In many instances, the data fetch to main memory is not necessary when a dirty copy of the data resides in one of the caches. In one example, the data fetch to main memory is not necessary when one of the caches has a copy of the memory line in a modified or owned state. Any mechanism for accessing main memory and forwarding the retrieved data to a processor is referred to herein as a data fetch. Any mechanism for eliciting a response from a node to maintain cache coherency in a system is referred to herein as a probe. In one example, a mechanism for snooping a cache is referred to as a probe. A response to a probe can be directed to the source or target of the initiating request.

Reducing the number of data fetches is effective in reducing the number of messages transmitted between resources and improving system data bandwitdh in a multiple processor system. In typical implementations, requests are sent to a memory controller that sends probes to various nodes in a single cluster system. The memory controller also initiates a data fetch. A memory cancel is issued if a dirty copy of the memory line is found in one of the probed nodes. According to various embodiments, mechanisms are provided to efficiently implement memory cancels in a multiple cluster system. In typical multiple cluster systems, no knowledge of the cache line state is known. All nodes in the system are probed and the memory controller may not receive a memory cancel from a remote node until well after an unnecessary data fetch has completed. This arises typically because the latency to determine if a remote node has a dirty copy of the memory line is much longer than the latency to determine if a home node has a dirty copy of the memory line.

In a system with a coherence directory, however, state information associated with various memory lines can be used to reduce the number of transactions. Any mechanism for maintaining state information associated with various probes is referred to herein as a coherence directory. A coherence directory typically includes information for memory lines in a local cluster that are cached in a remote cluster. According to various embodiments, a coherence directory is used to preemptively transmit a memory cancel to a memory controller by inferring the state of the memory line in remote caches.

FIG. 1A is a diagrammatic representation of one example of a multiple cluster, multiple processor system that can use the techniques of the present invention. Each processing cluster 101, 103, 105, and 107 can include a plurality of processors. The processing clusters 101, 103, 105, and 107 are connected to each other through point-to-point links 111a–f. In one embodiment, the multiple processors in the multiple cluster architecture shown in FIG. 1A share the same memory space. In this example, the point-to-point links 111a–f are internal system connections that are used in place of a traditional front-side bus to connect the multiple processors in the multiple clusters 101, 103, 105, and 107. The point-to-point links may support any point-to-point coherence protocol.

Figure 1B:
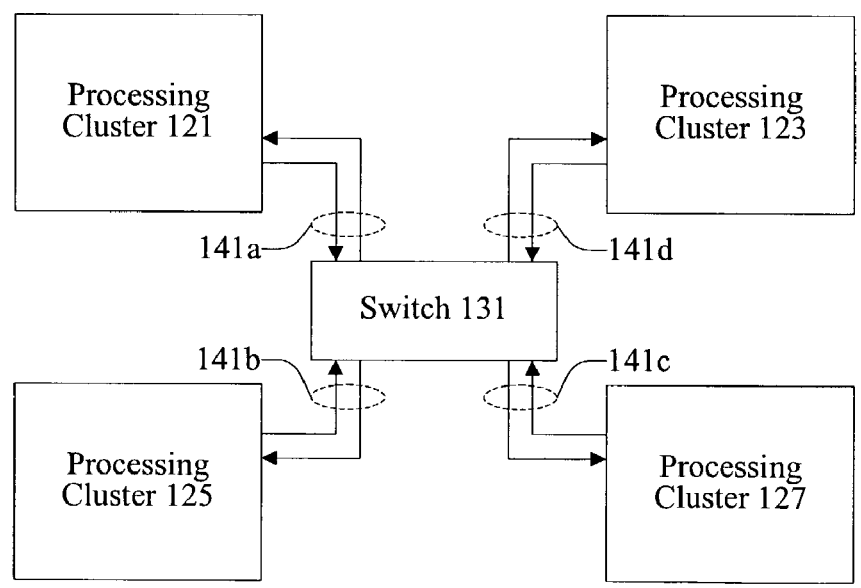

FIG. 1B is a diagrammatic representation of another example of a multiple cluster, multiple processor system that can use the techniques of the present invention. Each processing cluster 121, 123, 125, and 127 can be coupled to a switch 131 through point-to-point links 141a–d. It should be noted that using a switch and point-to-point links allows implementation with fewer point-to-point links when connecting multiple clusters in the system. A switch 131 can include a processor with a coherence protocol interface. According to various implementations, a multicluster system shown in FIG. 1A is expanded using a switch 131 as shown in FIG. 1B.

Figure 2:
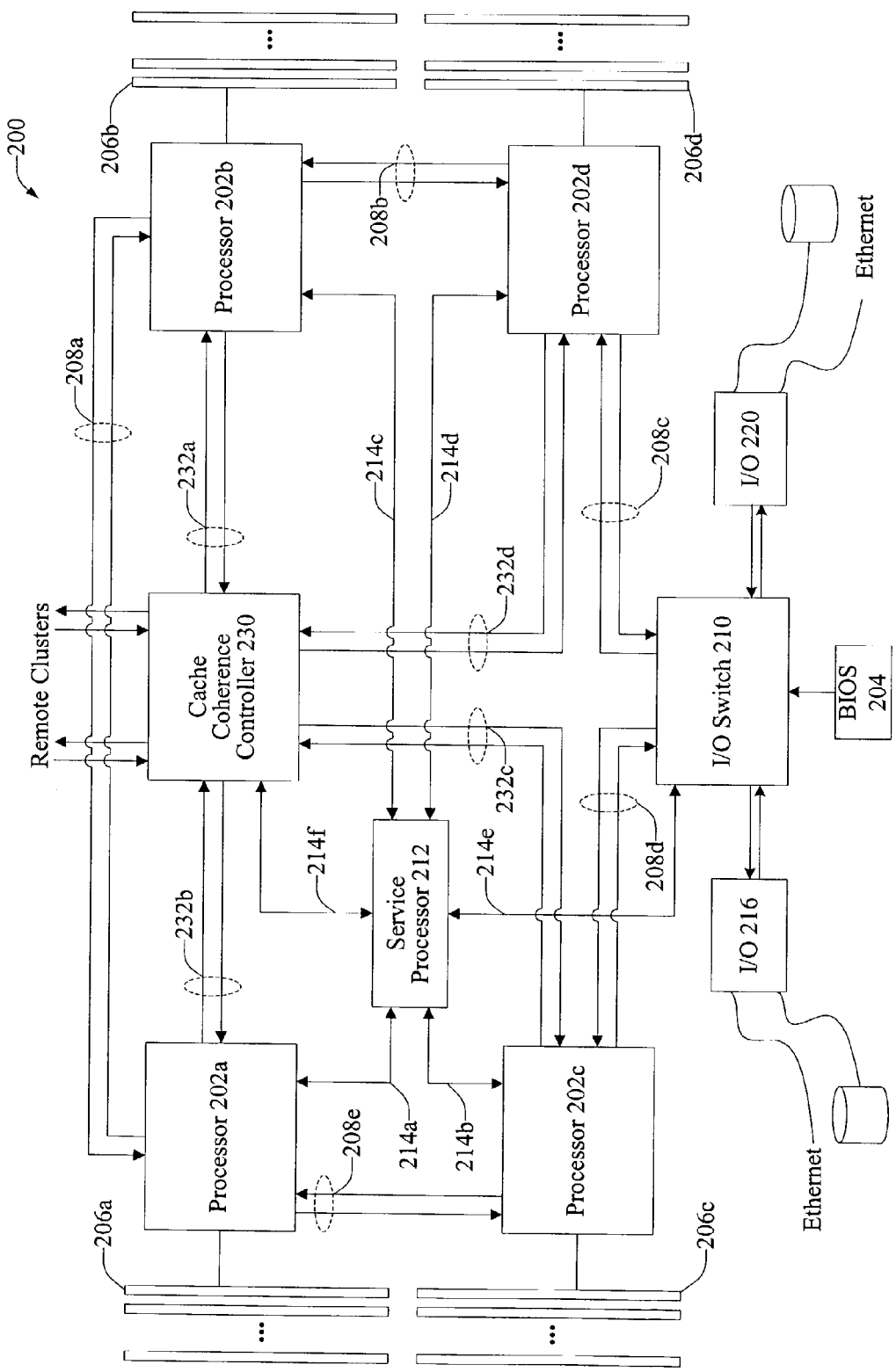
FIG. 2 is a diagrammatic representation of a cluster having a plurality of processors.

FIG. 2 is a diagrammatic representation of a multiple processor cluster, such as the cluster 101 shown in FIG. 1A. According to various embodiments, cluster 200 includes processors 202a–202d, one or more Basic I/O systems (BIOS) 204, a memory subsystem comprising memory banks 206a–206d, point-to-point communication links 208a–208e, and a service processor 212. The point-to-point communication links are configured to allow interconnections between processors 202a–202d, I/O switch 210, and cache coherence controller 230. The service processor 212 is configured to allow communications with processors 202a–202d, I/O switch 210, and cache coherence controller 230 via a JTAG interface represented in FIG. 2 by links 214a–214f. It should be noted that other interfaces are supported. It should also be noted that in some implementations, a service processor is not included in multiple processor clusters. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein.

The processors 202a–d are also coupled to a cache coherence controller 230 through point-to-point links 232a–d. Any mechanism or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 communicates with both processors 202a–d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of server 200 will be assumed. For example, most of the resources shown in FIG. 2 are assumed to reside on a single electronic assembly. In addition, memory banks 206a–206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor which includes integrated chipset functions. The cache coherence controller 230 is an Application Specific Integrated Circuit (ASIC) supporting the local point-to-point coherence protocol. The cache coherence controller 230 can also be configured to handle a non-coherent protocol to allow communication with I/O devices. In one embodiment, the cache coherence controller 230 is a specially configured programmable chip such as a programmable logic device or a field programmable gate array.

Figure 3:
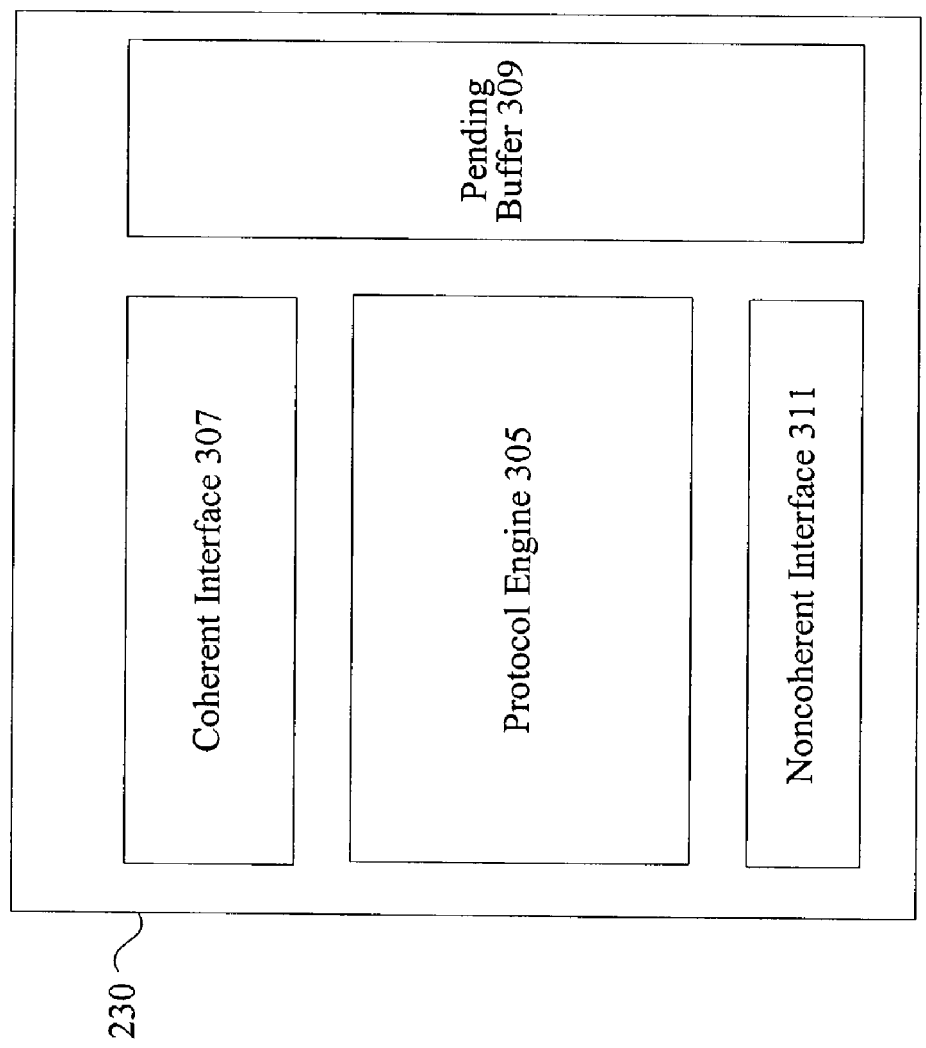
FIG. 3 is a diagrammatic representation of a cache coherence controller.

FIG. 3 is a diagrammatic representation of one example of a cache coherence controller 230. According to various embodiments, the cache coherence controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the cache coherence controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The cache coherence controller has an interface such as a coherent protocol interface 307 that allows the cache coherence controller to communicate with other processors in the cluster as well as external processor clusters. According to various embodiments, each interface 307 and 311 is implemented either as a full crossbar or as separate receive and transmit units using components such as multiplexers and buffers. The cache coherence controller can also include other interfaces such as a non-coherent protocol interface 311 for communicating with I/O devices. It should be noted, however, that the cache coherence controller 230 does not necessarily need to provide both coherent and non-coherent interfaces. It should also be noted that a cache coherence controller in one cluster can communicate with a cache coherence controller in another cluster.

Figure 4:
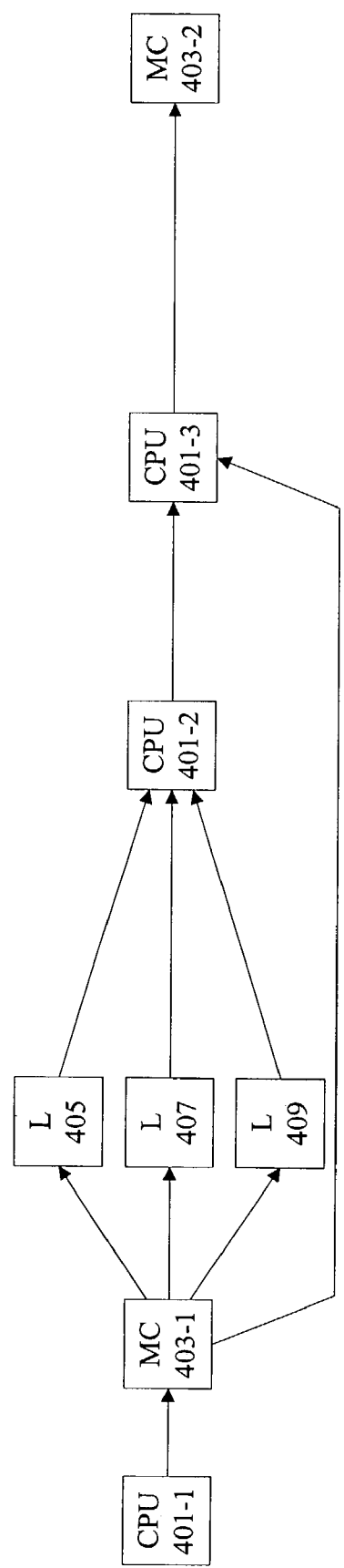
FIG. 4 is a diagrammatic representation showing a transaction flow for a data access request from a processor in a single cluster.

FIG. 4 is a diagrammatic representation showing the transactions for a cache request from a processor in a system having a single cluster without using a cache coherence controller. A processor 401-1 sends an access request such as a read memory line request to a memory controller 403-1. The memory controller 403-1 may be associated with this processor, another processor in the single cluster or may be a separate component such as an ASIC or specially configured Programmable Logic Device (PLD). To preserve cache coherence, only one processor is typically allowed to access a memory line corresponding to a shared address space at anyone given time. To prevent other processors from attempting to access the same memory line, the memory line can be locked by the memory controller 403-1. All other requests to the same memory line are blocked or queued. Access by another processor is typically only allowed when the memory controller 403-1 unlocks the memory line.

The memory controller 403-1 then sends probes to the local cache memories 405, 407, and 409 to determine cache states. The local cache memories 405, 407, and 409 then in turn send probe responses to the same processor 401-2. The memory controller 403-1 also sends an access response such as a read response to the same processor 401-3. The processor 401-3 can then send a done response to the memory controller 403-2 to allow the memory controller 403-2 to unlock the memory line for subsequent requests. It should be noted that CPU 401-1, CPU 401-2, and CPU 401-3 refer to the same processor.

FIGS. 5A–5D are diagrammatic representations depicting cache coherence controller operation. The use of a cache coherence controller in multiprocessor clusters allows the creation of a multiprocessor, multicluster coherent domain without affecting the functionality of local nodes such as processors and memory controllers in each cluster. In some instances, processors may only support a protocol that allows for a limited number of processors in a single cluster without allowing for multiple clusters. The cache coherence controller can be used to allow multiple clusters by making local processors believe that the non-local nodes are merely a single local node embodied in the cache coherence controller. In one example, the processors in a cluster do not need to be aware of processors in other clusters. Instead, the processors in the cluster communicate with the cache coherence controller as though the cache coherence controller were representing all non-local nodes.

It should be noted that nodes in a remote cluster will be referred to herein as non-local nodes or as remotes nodes. However, non-local nodes refer to nodes not in a request cluster generally and includes nodes in both a remote cluster and nodes in a home cluster. A cluster from which a data access or cache access request originates is referred to herein as a request cluster. A cluster containing a serialization point for a particular data access request is referred to herein as a home cluster. Other clusters are referred to as remote clusters. The home cluster and the remote cluster are also referred to herein as non-local clusters.

Figure 5A:
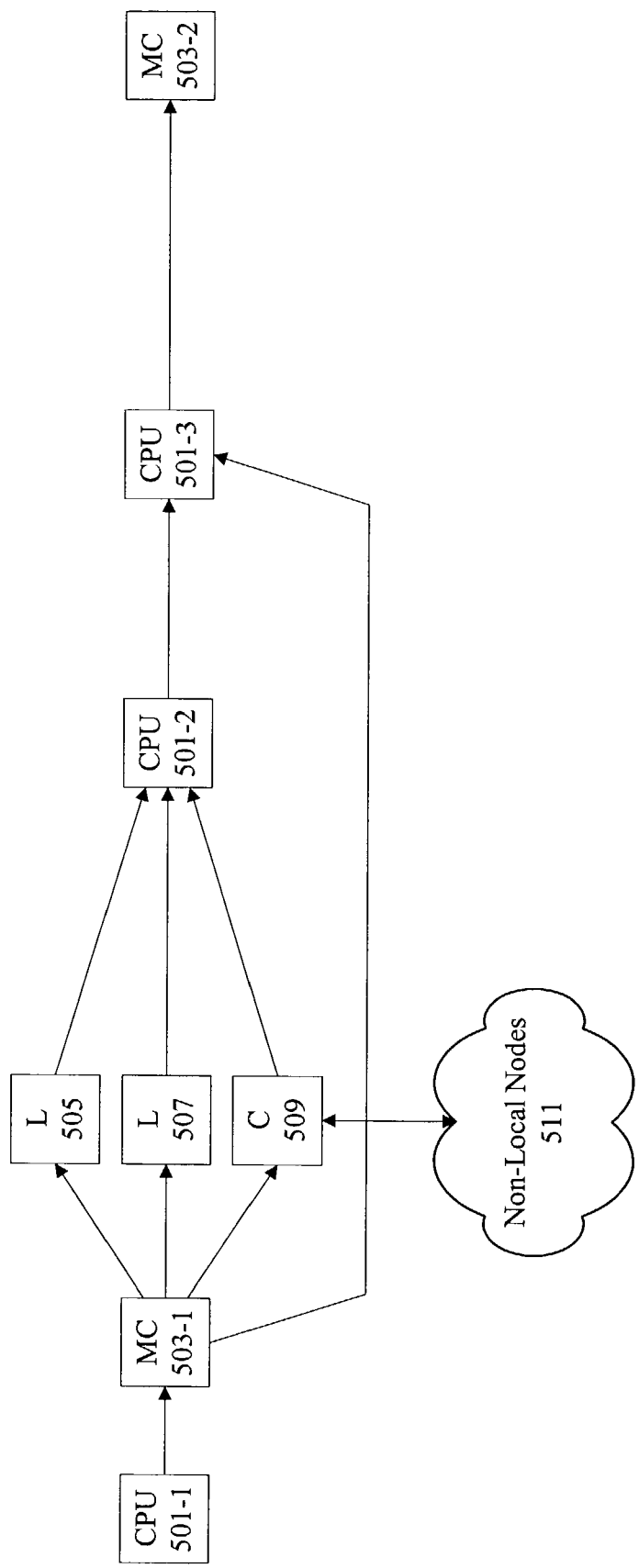
FIGS. 5A–5D are diagrammatic representations showing cache coherence controller functionality.

FIG. 5A shows the cache coherence controller acting as an aggregate remote cache. When a processor 501-1 generates a data access request to a local memory controller 503-1, the cache coherence controller 509 accepts the probe from the local memory controller 503-1 and forwards it to non-local node portion 511. It should be noted that a coherence protocol can contain several types of messages. In one example, a coherence protocol includes four types of messages; data or cache access requests, probes, responses or probe responses, and data packets. Data or cache access requests usually target the home node memory controller. Probes are used to query each cache in the system. The probe packet can carry information that allows the caches to properly transition the cache state for a specified line. Responses are used to carry probe response information and to allow nodes to inform other nodes of the state of a given transaction. Data packets carry request data for both write requests and read responses.

According to various embodiments, the memory address resides at the local memory controller. As noted above, nodes including processors and cache coherence controllers outside of a local cluster are referred to herein as non-local nodes. The cache coherence controller 509 then accumulates the response from the non-local nodes and sends a single response in the same manner that local nodes associated with cache blocks 505 and 507 send a single response to processor 501-2. Local processors may expect a single probe response for every local node probed. The use of a cache coherence controller allows the local processors to operate without concern as to whether non-local nodes exist.

It should also be noted that components such as processor 501-1 and processor 501-2 refer herein to the same component at different points in time during a transaction sequence. For example, processor 501-1 can initiate a data access request and the same processor 501-2 can later receive probe responses resulting from the request.

Figure 5B:
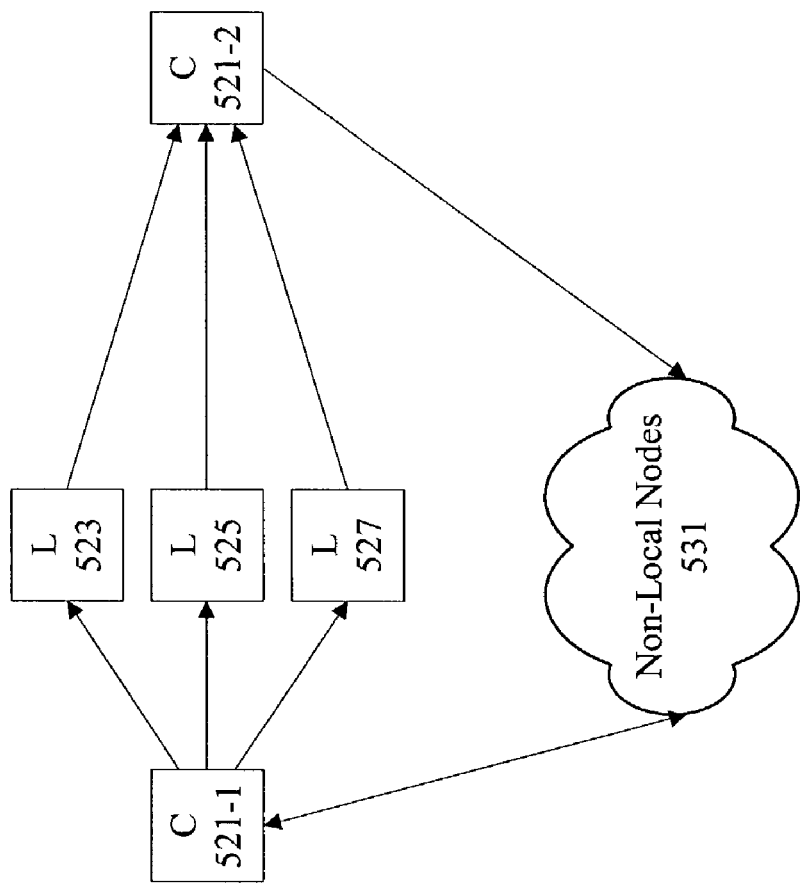

FIG. 5B shows the cache coherence controller acting as a probing agent pair. When the cache coherence controller 521-1 receives a probe from non-local nodes 531, the cache coherence controller 521-1 accepts the probe and forwards the probe to local nodes associated with cache blocks 523, 525, and 527. The cache coherence controller 521-2 then forwards a final response to the non-local node portion 531. In this example, the cache coherence controller is both the source and the destination of the probes. The local nodes associated with cache blocks 523, 525, and 527 behave as if the cache coherence controller were a local processor with a local memory request.

Figure 5C:
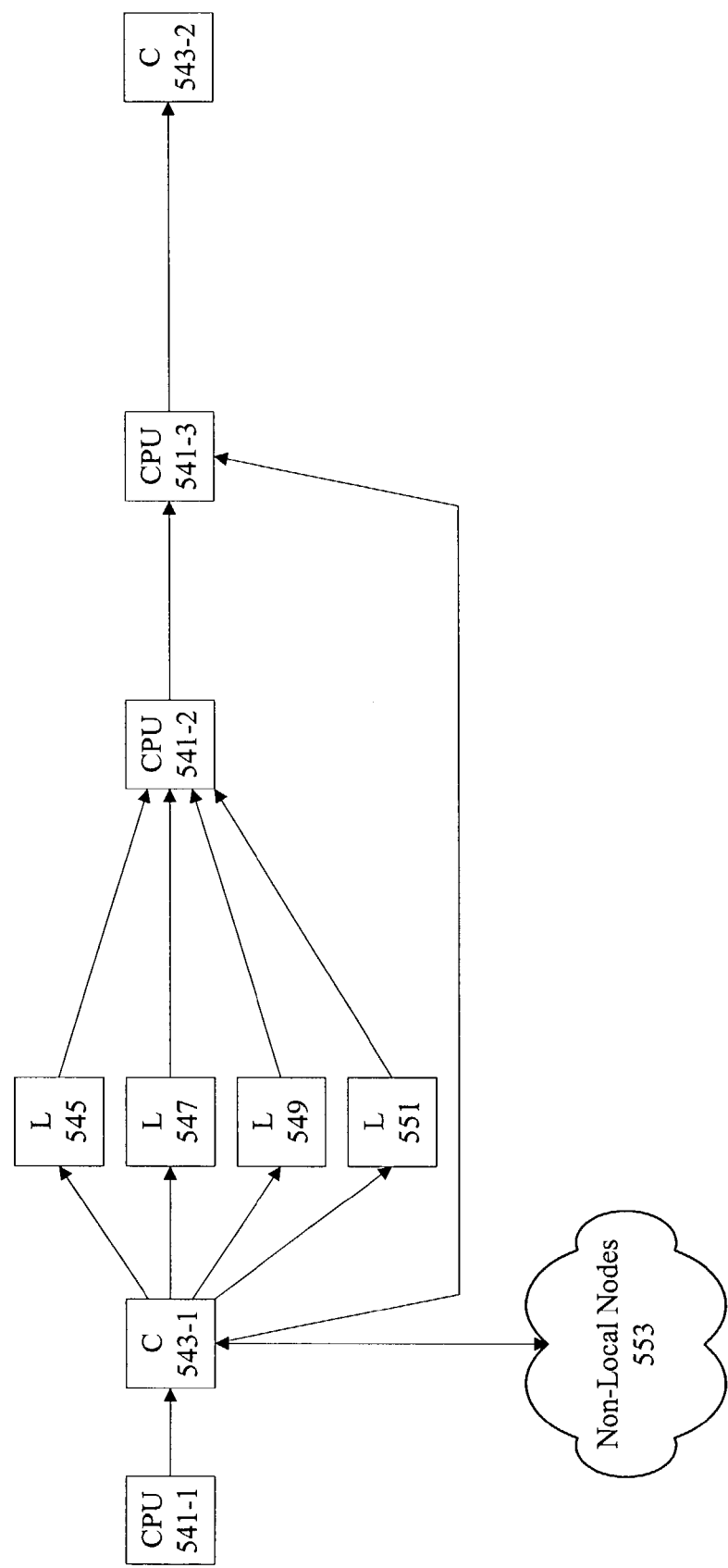

FIG. 5C shows the cache coherence controller acting as a remote memory. When a local processor 541-1 generates an access request that targets remote memory, the cache coherence controller 543-1 forwards the request to the non-local nodes 553. When the remote request specifies local probing, the cache coherence controller 543-1 generates probes to local nodes and the probed nodes provide responses to the processor 541-2. Once the cache coherence controller 543-1 has received data from the non-local node portion 553, it forwards a read response to the processor 541-3. The cache coherence controller also forwards the final response to the remote memory controller associated with non-local nodes 553.

Figure 5D:
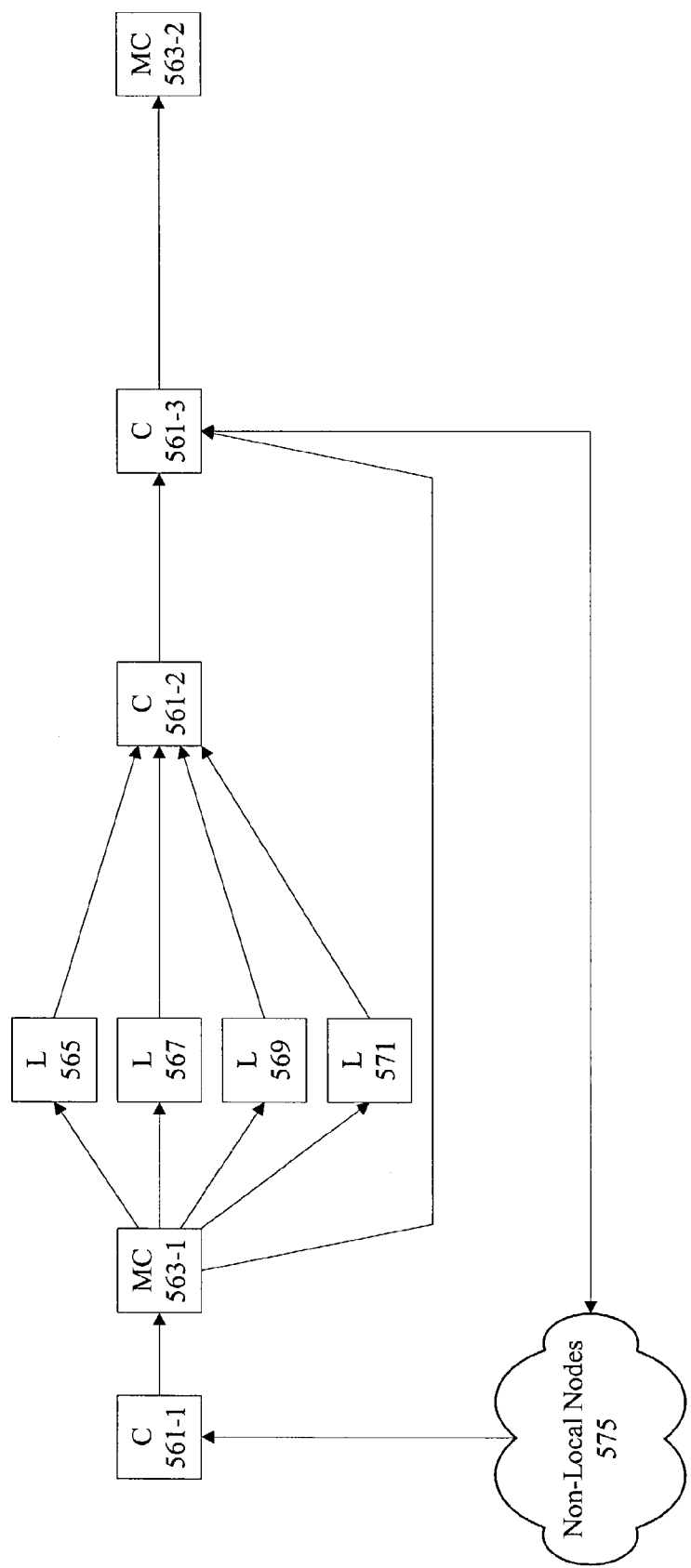

FIG. 5D shows the cache coherence controller acting as a remote processor. When the cache coherence controller 561-1 at a first cluster receives a request from a processor in a second cluster, the cache coherence controller acts as a first cluster processor on behalf of the second cluster processor. The cache coherence controller 561-1 accepts the request from portion 575 and forwards it to a memory controller 563-1. The cache coherence controller 561-2 then accumulates all probe responses as well as the data fetched and forwards the final response to the memory controller 563-2 as well as to non-local nodes 575.

By allowing the cache coherence controller to act as an aggregate remote cache, probing agent pair, remote memory, and remote processor, multiple cluster systems can be built using processors that may not necessarily support multiple clusters. The cache coherence controller can be used to represent non-local nodes in local transactions so that local nodes do not need to be aware of the existence of nodes outside of the local cluster.

Figure 6:
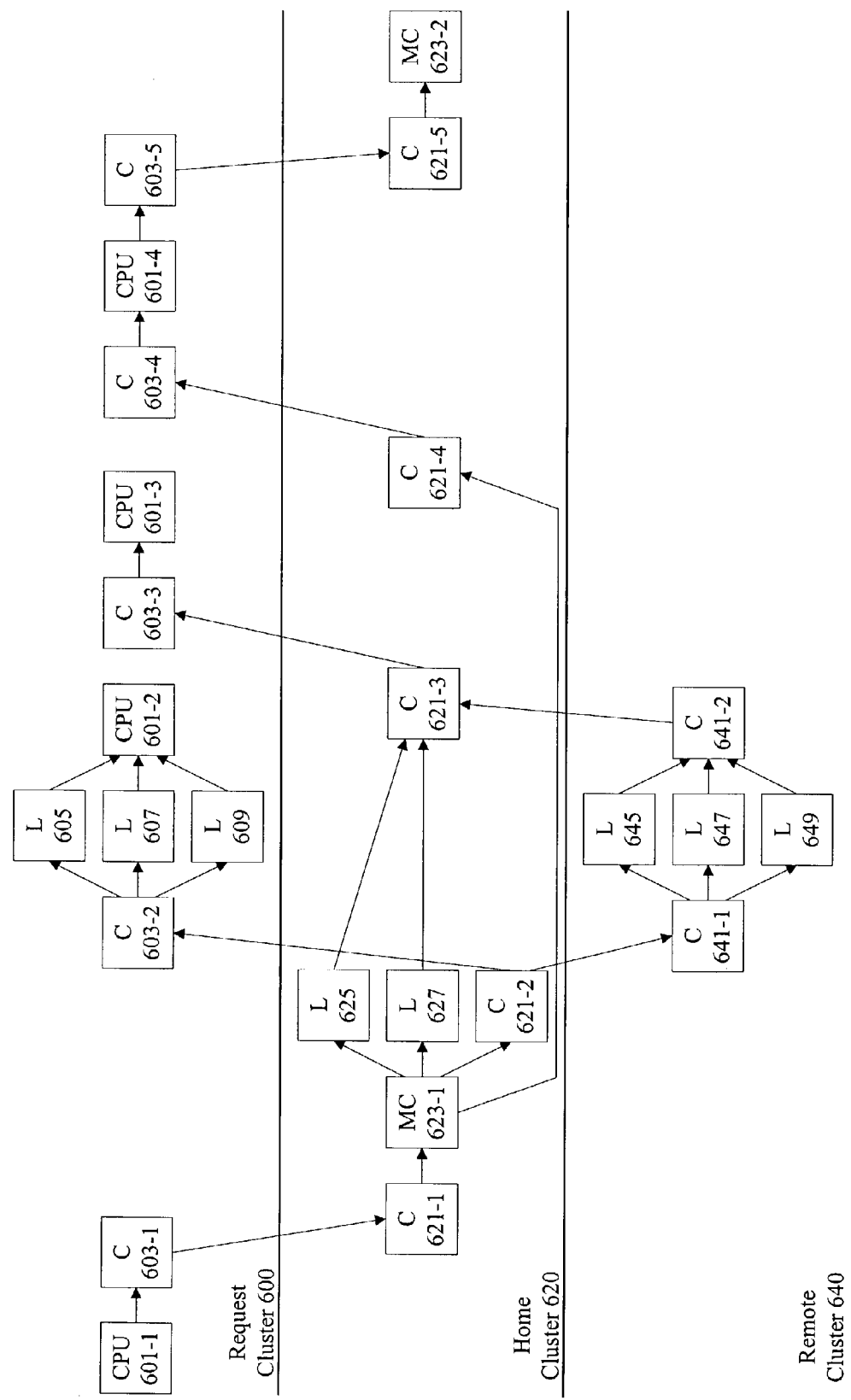
FIG. 6 is a diagrammatic representation depicting a transaction flow for a probe request with multiple probe responses.

FIG. 6 is a diagrammatic representation depicting the transactions for a data request from a local processor sent to a non-local cluster using a cache coherence controller. The multicluster system includes a request cluster 600, a home cluster 620, and a remote cluster 640. As noted above, the home cluster 620 and the remote cluster 640 as well as any other clusters excluding the request cluster 600 are referred to herein as non-local clusters. Processors and cache coherence controllers associated with local and non-local clusters are similarly referred to herein as local processors, local cache coherence controllers, non-local processors, and non-local cache coherence controllers, respectively.

According to various embodiments, processor 601-1 in a local cluster 600 sends a data access request such as a read request to a cache coherence controller 603-1. The cache coherence controller 603-1 tracks the transaction in the pending buffer of FIG. 3 and forwards the request to a cache coherence controller 621-1 in a home cluster 620. The cache coherence controller 621-1 at the home cluster 620 receives the access request and tracks the request in its pending buffer. In one example, information associated with the requests are stored in the pending buffer. The cache coherence controller 621-1 forwards the access request to a memory controller 623-1 also associated with the home cluster 620. At this point, the memory controller 623-1 locks the memory line associated with the request. In one example, the memory line is a unique address in the memory space shared by the multiple processors in the request cluster 600, home cluster 620, and the remote cluster 640. The memory controller 623-1 generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple cluster architecture to be transparent to various local nodes. It should be noted that write requests can be handled as well. In write requests, the targeted memory controller gathers responses and sends the responses to the processor when gathering is complete.

The cache coherence controller 641-1 associated with the remote cluster 640 receives a probe from cache coherence controller 621-2 and probes local nodes associated with cache blocks 645, 647, and 649. Similarly, the cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to the processor 601-3. Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at the home cluster 620 is now complete. Another processor can now access the unlocked memory line.

It should be noted that the transactions shown in FIG. 6 show examples of cache coherence controllers performing many different functions, including functions of remote processors, aggregate local caches, probing agent pairs, and remote memory as described with reference to FIGS. 5A–5D.

The cache coherence controller 621-1 at the home cluster 620 is acting as a remote processor. When the cache coherence controller receives a request from a request cluster processor, the cache coherence controller is directed to act as the requesting processor on behalf of the request cluster processor. In this case, the cache coherence controller 621-1 accepts a forwarded request from processor 601-1 and sends it to the memory controller 623-1, accumulates responses from all local nodes and the memory controller 623-1, and forwards the accumulated responses and data back to the requesting processor 601-3. The cache coherence controller 621-5 also forwards a source done to the local memory controller 623-2.

The cache coherence controller 603-1 at the request cluster 600 is acting as a remote memory. As remote memory, the cache coherence controller is designed to forward a request from a processor to a proper remote cluster and ensure that local nodes are probed. In this case, the cache coherence controller 603-1 forwards a probe to cache coherence controller 621-1 at a home cluster 620. Cache coherence controller 603-2 also probes local nodes 605, 607, and 609.

The cache coherence controller 641-1 at the request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, the cache coherence controller 641-1 sends a probe to local nodes associated with cache blocks 645, 647, and 649, gathers probe responses and sends the probe responses to cache coherence controller 621-3 at home cluster 620. Similarly, cache coherence controller 603-2 also acts as a probing agent pair at a request cluster 600. The cache coherence controller 603-2 forwards probe requests to local nodes including local nodes associated with cache blocks 605, 607, and 609.

The cache coherence controller 621-2 and 621-3 is also acting as an aggregate remote cache. The cache coherence controller 621-2 is responsible for accepting the probe from the memory controller 623-1 and forwarding the probe to the other processor clusters 600 and 640. More specifically, the cache coherence controller 621-2 forwards the probe to cache coherence controller 603-2 corresponding to request cluster 600 and to cache coherence controller 641-1 corresponding to remote cluster 640. As noted above, using a multiple cluster architecture may introduce delay as well as other undesirable elements such as increased traffic and processing overhead.

By using a coherence directory, global memory line state information (with respect to each cluster) can be maintained and accessed by a memory controller or a cache coherence controller in a particular cluster. According to various embodiments, the coherence directory tracks and manages the distribution of probes as well as the receipt of responses.

FIG. 7 is one example of a coherence directory that can be used to increase data access efficiency. Various coherence directories are available. In one example, a full directory provides an entry for every memory line in a system. In this example, the coherence directory is maintained at the memory controller and is accessible by a cache coherence controller. However, in a system with a large amount of system memory, a full directory may not be efficient or practical. According to various embodiments, a sparse directory is provided with a limited number of entries associated with a selected set of memory lines. In one example, the coherence directory 701 includes state information 713, dirty data owner information 715, and an occupancy vector 717 associated with the memory lines 711. In some embodiments, the memory line states are modified, owned, shared, and invalid.

It should be noted that the coherence directory 701 may track all caches or only remote cluster caches. According to various embodiments, a system coherence directory 701 is configured to track only remote caches. In the invalid state, a memory line is not currently available in cache associated with remote clusters. In the shared state, a memory line may be present in more than one remote cache, but the memory line has not been modified in any of these caches. When a memory line is in the shared state, an occupancy vector 717 can be checked to determine what caches share the relevant data. An occupancy vector 717 may be implemented as an N-bit string, where each bit represents the availability of the data in the cache of N clusters. Any mechanism for tracking what clusters hold a copy of the relevant memory line in cache is referred to herein as an occupancy vector. The memory line with address 741 is in the shared state, and the occupancy vector 717 indicates that clusters 1 and 3 each have a copy of the shared memory line in cache.

In the modified state, a memory line has been modified and the modified copy exists in cache associated with a particular remote cluster. When a memory line is modified, dirty data owner information field 715 can be checked to determine the owner of the dirty data. Any mechanism for indicating what cluster owns a modified copy of the memory line in cache is referred to herein as a dirty data owner information field. In one example, the memory line associated with address 781 is modified, and the dirty data owner field 715 indicates that cluster 2 owns the memory line.

In the owned state, a memory line is owned by a single cache but may be resident in multiple caches. It has been read by the owning cache, but has not been modified. If the memory line is in the owned state, dirty data owner field 715 can be accessed to determine which cluster owns the dirty data. In one example, the memory line associated with address 761 is in the owned state and is owned by cluster 4. The occupancy vector 717 can also be checked to determine what other caches may have the relevant data. In this example, the occupancy vector 717 indicates that clusters 2, 3, and 4 each have a copy of the data associated with the memory line in cache.

Although the coherence directory 701 includes the four states of modified, owned, shared, and invalid, it should be noted that particular implementations may use a different set of states. In one example, a system may have the five states of modified, exclusive, owned, shared, and invalid. The techniques of the present invention can be used with a variety of different possible memory line states.

The coherence directory tracks the various transactions such as probe requests and responses in a multiple cluster system to determine when memory lines are added to the coherence directory, when memory lines are removed from the directory, and when information associated with each memory line is updated. By using the coherence directory, the techniques of the present invention recognize that the number of transactions such as probe requests can be reduced.

In a typical single cluster implementation, a memory cancel mechanism is provided to cancel a data fetch from memory if the cached memory line associated with a probe request is determined to be dirty. Any cache state indicating that the data in memory may not valid is a dirty state. In one example, a cache line in a modified or owned state indicates that data in memory is dirty. According to various embodiments, the CPU issues a request to a memory controller. A memory controller can then probe processor nodes. Any group of resources including a processor and cache memory is referred to herein as a processor node, node, or processor. The node can also include resources such as a memory controller and a cache controller. In many implementations, the memory controller forwards probes to processor nodes. If the node determines that the memory line associated with the probe is dirty, a memory cancel is sent to the memory controller. Any mechanism instructing the memory controller to cancel a data fetch from a memory is referred to herein as a memory cancel.

In typical implementations, the memory cancel signal is generated by a cache controller associated with the cache in a processor node. In a single cluster system, the memory cancel often is received in time for the memory controller to either cancel the data fetch from main memory or prevent forwarding of the data retrieved from memory to the CPU. By preventing the fetch or forwarding of stale data from main memory, exatraneous signals are not transmitted in a single cluster system.

Figure 8:
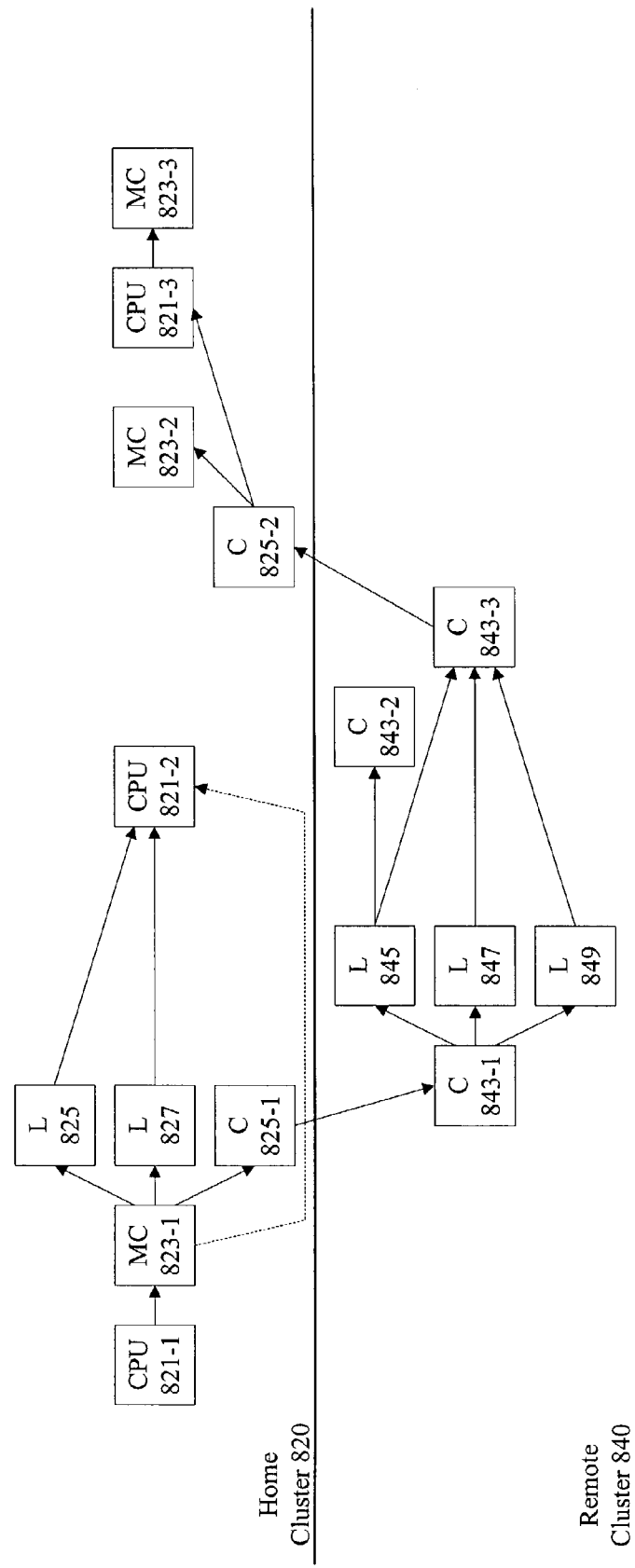
FIG. 8 is a diagrammatic representation showing memory cancel usage in a multiple cluster system.

FIG. 8 is a diagrammatic representation showing a multiple cluster system using a memory cancel mechanism. The CPU 821-1 in-home cluster 820 sends a request to a memory controller 823-1. The memory controller 823-1 forwards a probe to local nodes 825 and 827. The memory controller 823-1 also forwards the probe to cache coherence controller 825-1. The cache coherence controller 825-1 at the home cluster forwards the probe to a remote cluster 840. Remote cluster cache coherence controller 843-1 sends the probe to nodes 845, 847, and 849. In one example, a local node 845 determines that the memory line associated with the probe is dirty. In this example, the dirty memory line may indicate that the data in cache has been modified or is owned by the associated processor. Consequently, a signal should be sent to the memory controller in the home cluster to take the data from cache 845 instead of from main memory, as the main memory data is stale or invalid.

The cache coherence controller 843-2 receives a memory cancel from the cache 845. The cache coherence controller 843-3 receives a read response from the cache 845 and probe responses from caches 847 and 849. According to various embodiments, the memory cancel and the read response are received as separate packets. The cache coherence controller 843-3 forwards the probe response and the memory cancel to a home cluster cache coherence controller 825-2. The cache coherence controller in the home cluster 825-2 then sends the read response to the CPU 821-3 and sends a memory cancel to the memory controller 823-2. However, by the time the memory controller 823-2 receives the memory cancel originating from the remote cluster, the data fetch by the memory controller likely has already completed. In one example, the memory controller retrieves the data from main memory and sends a read response to the CPU 821-2 before the memory controller 823-2 receives the memory cancel from the cache coherence controller 825-2. Consequently, a main memory data access and a read response were extraneously performed.

Figure 9:
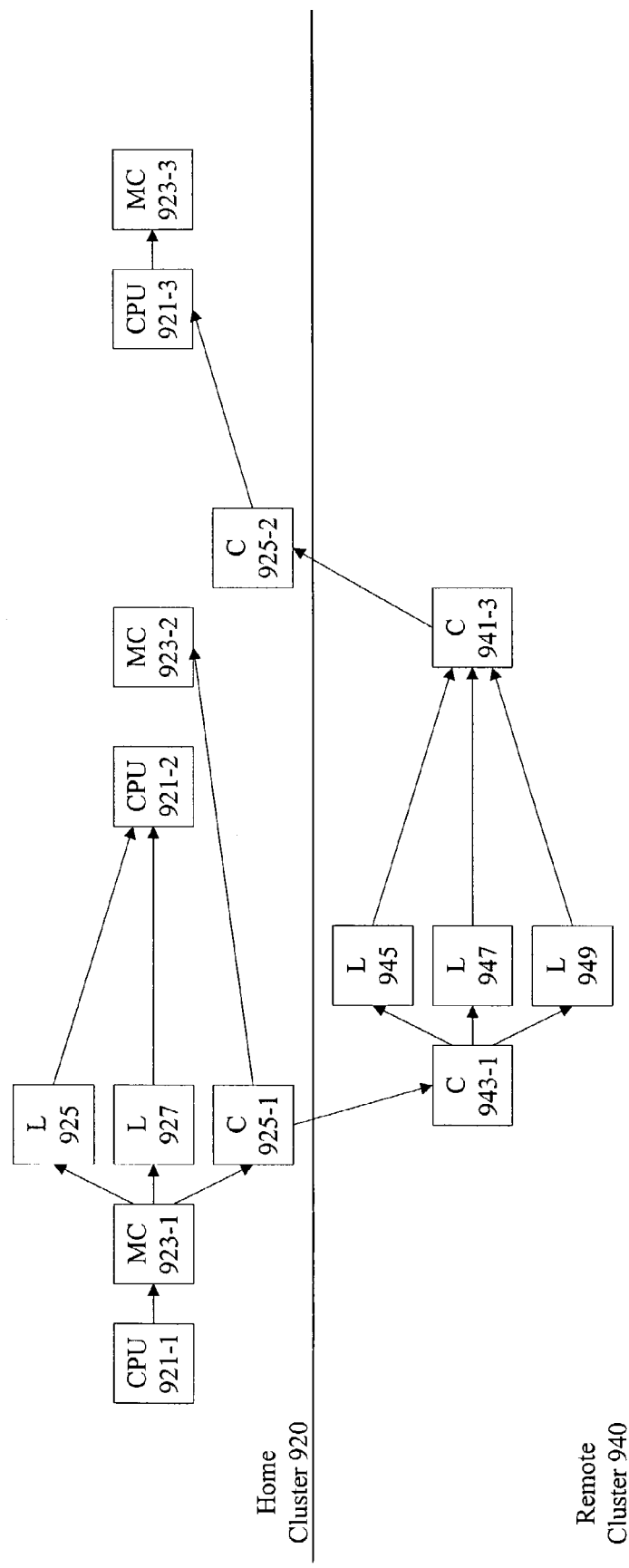
FIG. 9 is a diagrammatic representation showing another example of memory cancel usage in a multiple cluster system.

FIG. 9 is a diagrammatic representation showing a memory cancel without the extraneous data access read response. The CPU 921-1 in a home cluster 920 sends a request a memory controller 923-1. The memory controller 923-1 forwards probes to nodes 925 and 927. The memory controller 923-1 also forwards the probe to cache coherence controller 925-1. The cache coherence controller 925-1 maintains information about the various memory lines of the multiple cluster system. In one example, the cache coherence controller 925-1 maintains a coherence directory indicating the state of various memory lines in remote caches. If an entry in the coherence directory matches the memory line of the probe, the state of the memory line as indicated in the coherence directory may indicate that the cache in a remote cluster has a dirty copy of the memory line. In one example, the dirty copy of the memory line may be indicated by a remote cluster cache having an owned or modified copy of the memory line.

According to various embodiments, the cache coherence controller 925-1 can immediately generate a memory cancel to the home cluster memory controller 923-2 in order to cancel the data fetch from main memory. By sending a memory cancel to the memory controller before the remote node would likely have generated the memory cancel, the cache coherence controller in the home cluster is more likely to have prevented the extraneous data fetch by the memory controller. The cache coherence controller 925-1 also forwards a probe to a cache coherence controller 943-1 in a remote cluster 940. The cache coherence controller 943-1 forwards the probes to nodes 945, 947, and 949. According to various embodiments, the probe forwarded by the cache coherence controller in the home cluster to the cache coherence controller the remote cluster includes an indicator not to generate a memory cancel, referred to herein as a memory cancel indicator.

In one embodiment, the cache coherence controller in a remote cluster forwards probes to remote nodes with an indicator instructing the cache controllers not to generate a memory cancel if the memory line probed is dirty. Consequently, local cache is sent probe responses to the cache coherence controller 941-3 in the remote cluster. According to various embodiments, the memory controller 923-3 expects a source done from a CPU 921-3 with a memory cancel bit corresponding to the memory cancel. Consequently, the cache coherence controller 925-2 typically needs to forward a read response to the CPU 921-3 that includes a cancel bit.

According to various embodiments the cache coherence controller 925-1 tracks the condition that a memory cancel corresponding to a probe forwarded to a remote cluster was sent to a memory controller. When the cache coherence controller 925-1 receives the corresponding read response, any associated memory cancel is suppressed so that the memory controller does not receive another memory cancel corresponding to the same memory line. According to various embodiments, the memory cancel can be suppressed by explicitly indicating to the remote cluster not to generate a memory cancel. In another example, a memory cancel is generated by the remote cluster but the memory cancel is not forwarded by the home cluster cache coherence controller to the memory controller in the home cluster.

The cache coherence controller 925-2 recognizes that a read response with a cancel bit set should be forwarded to the CPU 921-3 in a system where a cancel bit is expected by the memory controller 923-3. It should be noted, that it is contemplated that in some embodiments a memory controller may not expect a cancel bit. Consequently, a cancel bit may not necessarily be sent by the cache coherence controller in the home cluster. In some embodiments, a cache coherence controller sets a memory cancel bit in the pending buffer entry for a probe in order to remember that a memory cancel has been sent to the memory controller. When the cache coherence controller generates a read response back to the requesting CPU, the memory cancel bit will be set. The request will convey this information to the memory controller in the requesting CPU's source done message. In some embodiments, the memory controller will not unlock the associated memory line if the requesting CPU's final response has the memory cancel bit set and the memory cancel has not been received.

Figure 10:
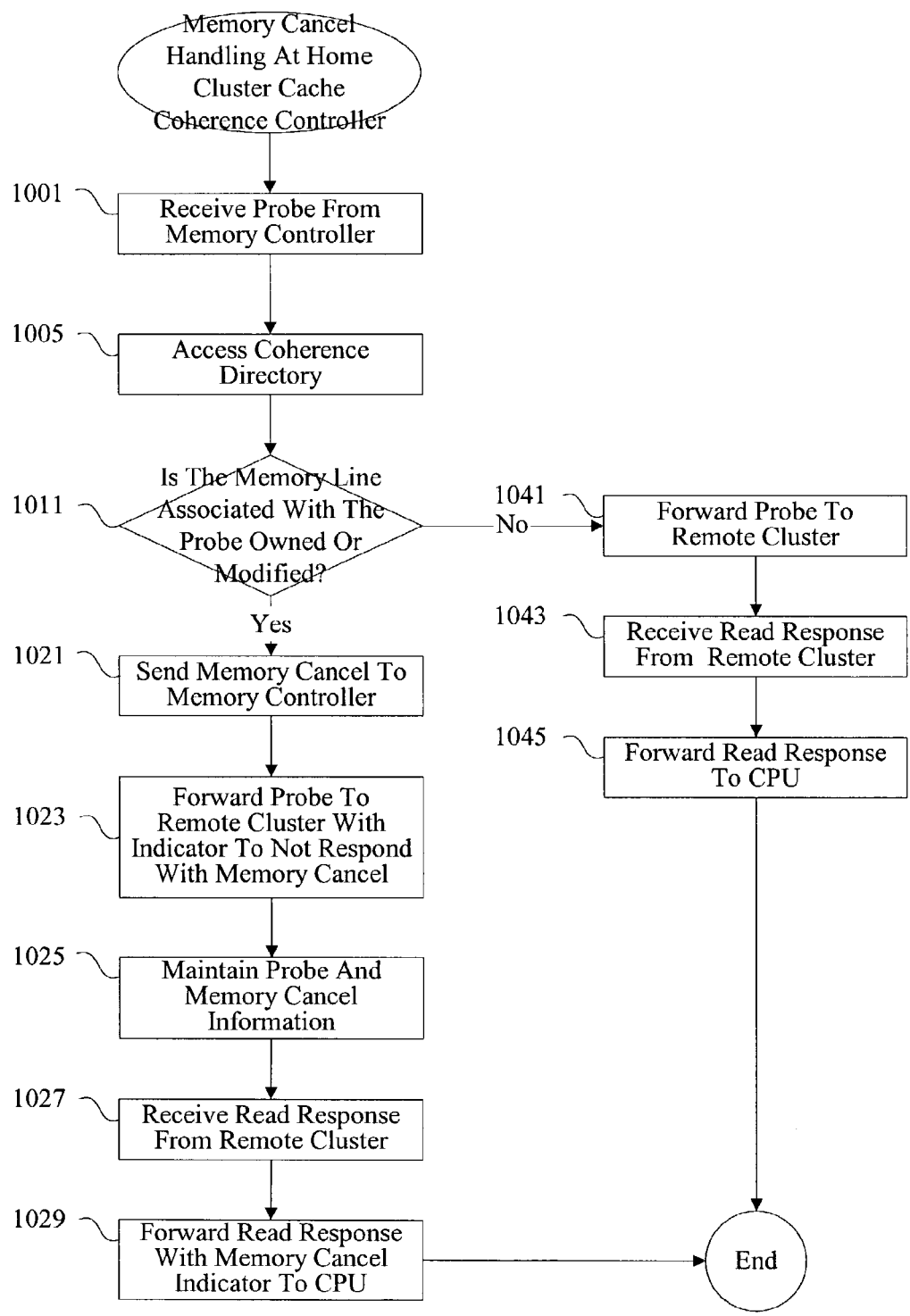
FIG. 10 is a flow process diagram showing the usage of memory cancel at a cache coherence controller at a home cluster.

FIG. 10 is a flow process diagram showing memory cancel handling at a home cluster cache coherence controller. At 1001, a probe is received from a memory controller. At 1005, information is accessed to determine the status of a memory line associated with the probe. According to various embodiments, a coherence directory is accessed to determine if the memory line associated with the probe is in the dirty state. In one example, the memory line is in a dirty state if the memory line is either owned or modified at 1011. If the memory line is not in the dirty state, the probe is forwarded to a remote cluster at 1041. Remote caches are then probed.

At 1043, a response such as a read response is received from a remote cluster. At 1045, the read response is forwarded to the CPU. If the memory line associated with the probe is in a dirty state, a memory cancel is sent to the home cluster memory controller at 1021. It should be noted that there typically is a memory controller for each processor in the cluster. At 1023, the probe is forwarded to the remote cluster. In one example, the probe is forwarded with an indicator to the remote caches to forego responding with a memory cancel. At 1025, probe and memory cancel information can be maintained at the home cluster cache controller to prevent the transmission of multiple memory cancels to the home cluster memory controller for the same probe. At 1027, a read response is received from the remote cluster. At 1029, the read response is forwarded to the CPU along with a memory cancel indicator that is set based on knowledge of a previously generated cancel by the cache coherence controller. The memory cancel indicator directs the CPU to send a source done with a cancel bit to the memory controller.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single cache coherence controller, or multiple cache coherence controllers can be used in a single cluster. Therefore, the scope of the invention should be determined with reference to the appended claims.

What is claimed is:

1. A computer system, comprising:
a home cluster including a first plurality of processors and a home cache coherence controller, the first plurality of processors and the home cache coherence controller interconnected in a point-to-point architecture;
a remote cluster including a second plurality of processors and a remote cache coherence controller, the second plurality of processors and the remote cache coherence controller interconnected in a point-to-point architecture;
wherein the remote cluster cache coherence controller is configured to receive a probe request associated with a memory line and send a memory cancel to the home cluster if a probed memory line associated with one of the second plurality of processors is dirty, wherein the memory cancel prevents an extraneous data fetch by a home cluster memory controller.

2. The computer system of claim 1, wherein the memory line is dirty if the memory line is in the modified or owned state.

3. The computer system of claim 1, wherein the memory cancel directs the home cluster memory controller to cancel a data fetch from main memory.

4. The computer system of claim 1, wherein the probed memory line is determined to be dirty by the remote cluster.

5. A method for probing a system, the method comprising:
receiving a probe request associated with a memory line at a remote cluster, the remote cluster including a plurality of processors and a remote cache coherence controller, the plurality of processors and the remote cache coherence controller interconnected in a point-to-point architecture;
determining if the probed memory line associated with one of the plurality of processors is dirty; and
sending a memory cancel to a home cluster including a home cluster cache coherence controller, wherein the memory cancel prevents an extraneous data fetch by a home cluster memory controller.

6. The method of claim 5, wherein the memory line is dirty if the memory line is in the modified or owned state.

7. The method of claim 5, wherein the memory cancel directs the home cluster memory controller to cancel a data fetch from main memory.

8. The method of claim 5, wherein the probed memory line is determined to be dirty by the remote cluster.

9. A cache coherence controller, the cache coherence controller comprising:
means for receiving a probe request associated with a memory line at a remote cluster cache coherence controller, the remote cluster including a plurality of processors and the remote cache coherence controller, the plurality of processors and the remote cache coherence controller interconnected in a point-to-point architecture;
means for determining if the probed memory line associated with one of the plurality of processors is dirty; and
means for sending a memory cancel to a home cluster including a home cluster cache coherence controller, wherein the memory cancel prevents an extraneous data fetch by a home cluster memory controller.

10. A computer system, comprising:
a home cluster including a first plurality of processors and a home cache coherence controller, the first plurality of processors and the home cache coherence controller interconnected in a point-to-point architecture;
a remote cluster including a second plurality of processors and a remote cache coherence controller, the second plurality of processors and the remote cache coherence controller interconnected in a point-to-point architecture;
wherein the home cluster cache coherence controller is configured to forward a probe to the remote cluster and send a memory cancel to a home cluster memory controller if the home cluster cache coherence controller determines that the memory line is dirty, wherein the memory cancel prevents an extraneous data fetch by a home cluster memory controller.

11. The computer system of claim 10, wherein the memory line is dirty if the memory line is in the modified or owned state.

12. The computer system of claim 10, wherein the home cluster cache coherence controller determines that the memory line associated with the probe in the remote cluster is dirty by referencing a coherence directory.

13. The computer system of claim 10, wherein the home cluster cache coherence controller forwards a probe with a memory cancel indicator to the remote cluster.

14. The computer system of claim 13, wherein the home cluster cache coherence controller further tracks the condition that no memory cancel will be received from the remote cluster.

15. The computer system of claim 13, wherein the home cluster coherence controller sets the cancel bit in the read response from the remote cluster based on knowledge of a previously generated cancel response.

16. A method for probing remote nodes, the method comprising:

determining at a home cluster if the memory line associated with a request is dirty, a home cluster including a first plurality of processors and a home cache coherence controller, the first plurality of processors and the home cache coherence controller interconnected in a point-to-point architecture;

forwarding a probe to a remote cluster, the remote cluster including a second plurality of processors and a remote cache coherence controller, the second plurality of processors and the remote cache coherence controller interconnected in a point-to-point architecture; and sending a memory cancel to the home cluster memory controller before a response to the probe is received from the remote cluster, wherein the memory cancel prevents an extraneous data fetch by a home cluster memory controller.

17. The method of claim 16, wherein the memory line is dirty if the memory line is in the modified or owned state.

18. The method of claim 16, wherein the home cluster cache coherence controller determines that the memory line associated with the probe in the remote cluster is dirty by referencing a coherence directory.

19. The method of claim 16, wherein the home cluster cache coherence controller forwards a probe with a memory cancel indicator to the remote cluster.

20. The method of claim 19, wherein the home cluster cache coherence controller further tracks the condition that no memory cancel will be received from the remote cluster.

21. The method of claim 19, wherein the home cluster coherence controller sets the cancel bit in the read response from the remote cluster based on knowledge of a previously generated cancel response.

22. The method of claim 16, wherein sending the memory cancel to the home cluster memory controller before a response is received from the remote cluster increases the likelihood that a memory fetch will not complete.

23. The method of claim 22, wherein the memory fetch includes acquiring invalid data from memory and forwarding the invalid data to a home cluster processor originating the probe request.

24. The method of claim 23, wherein preventing the unnecessary memory fetch of invalid data saves system resources.

25. A multiple processor system, comprising:

means for determining at a home cluster if the memory line associated with a request is dirty, a home cluster including a first plurality of processors and a home cache coherence controller, the first plurality of processors and the home cache coherence controller interconnected in a point-to-point architecture;

means for forwarding a probe to a remote cluster, the remote cluster including a second plurality of processors and a remote cache coherence controller, the second plurality of processors and the remote cache coherence controller interconnected in a point-to-point architecture; and means for sending a memory cancel to the home cluster memory controller before a response to the probe is received from the remote cluster, wherein the memory cancel prevents an extraneous data fetch by a borne cluster memory controller.

* * * * *